United States Patent Office 3,560,187
Patented Feb. 2, 1971

3,560,187
TANK FURNACE FOR CONTINUOUS PRODUCTION OF CRYSTAL GLASS
Mieczyslaw Hryszkiewicz and Michal Tokarski, both of Ul. Hutnicza 3, Stronie Slaskie, Poland; Jan Wojcicki, Ul. Orwicza 6, Krakow, Poland; and Zbigniew Uljasz, Ul. 22go Lipcoi 41, Sosnowiec, Poland
Continuation of application Ser. No. 487,354, Sept. 3, 1965. This application Jan. 13, 1969, Ser. No. 793,229
Claims priority, application Poland, Sept. 7, 1964, P 105,661
Int. Cl. C03b 5/18
U.S. Cl. 65—180
7 Claims

ABSTRACT OF THE DISCLOSURE

Apparatus for the continuous treatment of molten glass having a melting tank which opens via a narrow passageway at the bottom of the tank into a pair of cylindrical mixing chambers containing stirrers, the chambers being connected in parallel at the narrow passageway.

---

Figure 1:
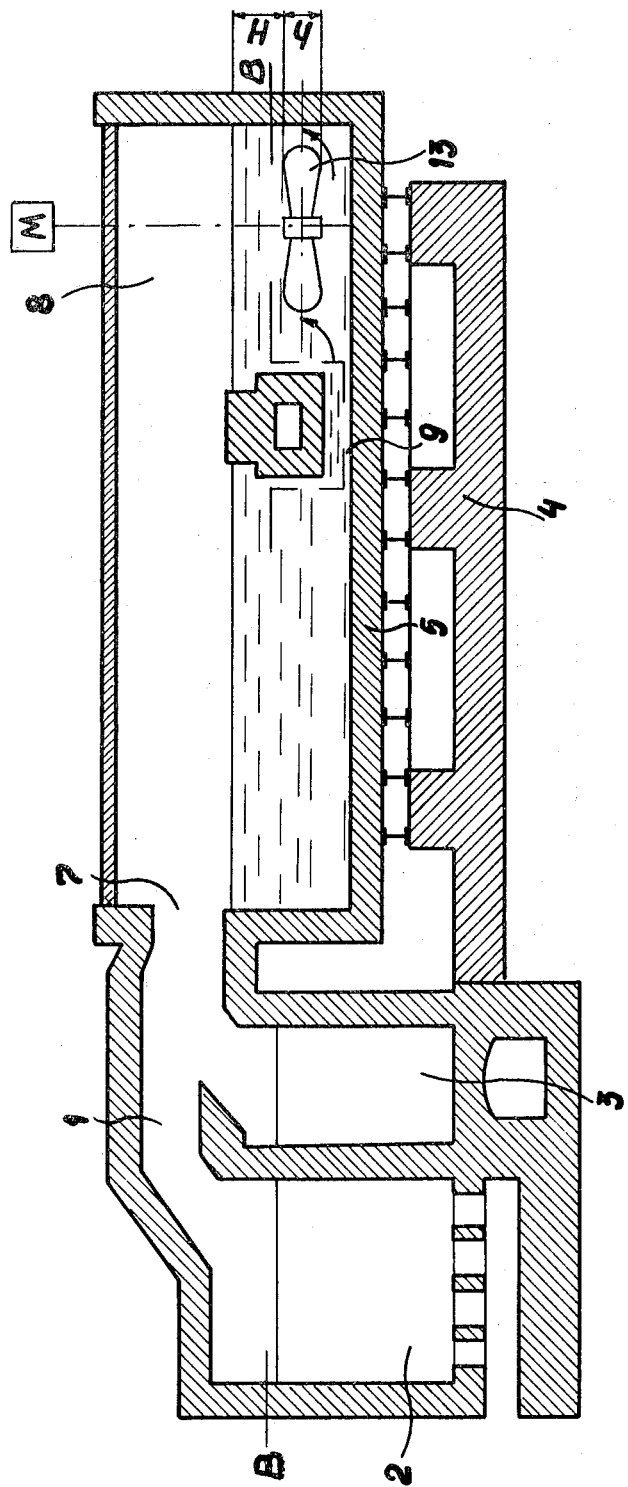

This is a streamlined continuation of application Ser. No. 487,354, filed Sept. 3, 1965, now abandoned.

The present invention relates to a tank furnace operating in a continuous way and used for production of crystal glass, especially for production of crystal glass of the lead type.

Up to now crystal glass has been produced in pot furnaces operating periodically, while in particular pots there is carried out the operation of melting the charge as well as the operation of homogenizing of the melted charge. The operation of homogenizing is based on mixing the melted glass in the pot by means of a rod to which there is secured wet wood, whereas the gas produced when the said wet wood comes into contact with the hot glass, causes intensive mixing of the glass compound.

The disadvantages of the above described known method of production of crystal glass are: low output due to the limited capacity of the furnace pots: the periodic nature of the operation of the pot furnace; and a longer preparatory cycle (two work-shifts) compared to the operational cycle (one work-shift). In addition there are two other basic faults of furnace pots, i.e. large material losses caused by leakage of the pots, and low thermal efficiency resulting in particular from the periodical operation of the said furnaces.

For production of certain kinds of glass, for example, for production of window glass or of optical glass, there are used also tank furnaces of the continuous operation type while in this production process the operation of homogenizing of the glass compound is based on mixing of the said compound either by means of a stream of compressed air or steam, or by means of mechanical vane mixers. There have been carried out attempts of application of the said tank furnaces for production of crystal glass of the lead type. However, these attempts have not given satisfactory results. The reason for the failure is that particular constituents of the glass compound differ so much one from another as far as their density is concerned that the mixing operation which is carried out only in certain parts of the mixing chamber, does not cause homogenization of the entire mass of the glass compound.

In addition, the operation of homogenizing is further impeded by unsuitable dimensions of the melting tank, as in the crystal glass process the rate at which the glass compound is taken from the furnace is lower than—for example—in the case of production of window glass. As a result, inside the melting section of the furnace tank there is comparatively large thermal gradient per unit of tank length, which further increases the differences of density in particular parts of the glass compound.

There have also been attempts to employ for production of crystal glass of the lead type, tank furnaces in which beside the melting section there was also provided a mixing section connected with the melting section by means of a channel, while in the said mixing section there was fitted a rotary mixer. These attempts also have not given satisfactory results. Here the failure was caused by the fact that in view of the high density and viscosity of the glass compound, a satisfactory homogeneity was obtained only near the mixer axis, while in sections of the mixing chamber which were placed further from this axis, there were found dead spaces in which particular constituents of the glass compound were separated one from another.

The above described faults have been obviated in a tank furnace according to the present invention, used for producing crystal glass continuously especially crystal glass, of the lead type, which tank furnace consists of a melting section of horseshoe shape, and of a mixing chamber connected by means of a passage with the said melting section, the mixing chamber having the shape of a cylindrical chamber in which there is placed axially a vane type mixer while the diameter of the mixing chamber is at most 30% larger than the maximum diameter of the mixer. As a result, the entire mass of the melted glass compound flowing into the mixing chamber is stirred, while its constituents are well mixed, which enables obtaining complete homogeneity in the entire mixing chamber.

In addition, the research work which resulted in the present invention, has shown that the output of a single mixing chamber of cylindrical shape is at least 50% lower than the output of the melting section of the tank furnace, as a result of the above mentioned limited diameter of the said mixing chamber. Moreover, any increment of the mixing chamber diameter of any change of the shape of its cross section always leads to the formation of dead spaces in which the glass compound is not sufficiently mixed. However, it has been found that the mixing section can be formed in such a way that it consists of two cylindrical mixing chambers in each of which there is provided an axially fitted mixer, while the said two mixing chambers are connected one with the other and with the passage leading from the melting section of the furnace, by means of channels, preferably of a cross section having the shape of a trapezoid.

The axes of the said two cylindrical chambers should be spaced in such a way that between the chambers there is formed a wedge shaped protrusion pointing towards the passage leading from the melting section, the purpose of this protrusion being to divide the stream of the glass compound flowing out through the passage from the melting chamber, and to direct it respectively to the two chambers of the mixing section of the furnace, and also to prevent the formation of dead spaces in the said chambers. The above mentioned research work has also shown that the output of the mixing section formed in the above described way, is approximately equal to the output of the melting section of the furnace tank, ensuring in this way continuous operation of the furnace, while the homogeneity of the crystal glass produced in such a furnace is quite sufficient even in the case of a considerable content up to 25% of the charge weight of lead oxide. This grade of homogeneity of the glass compound cannot be obtained by means of any of the heretofore known furnaces operating in a continuous way.

Figure 2:
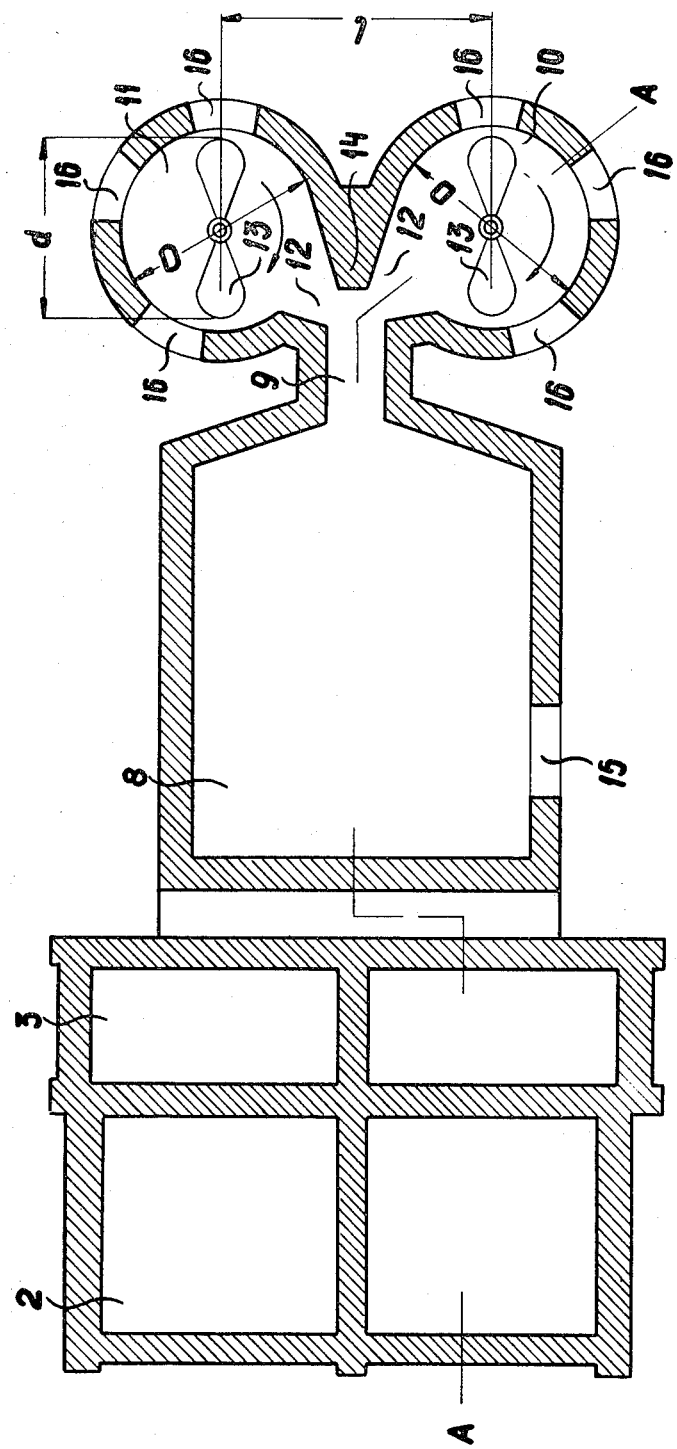

The present invention will be further described, by way of example, with reference to the accompanying drawings in which:

FIG. 1 is a vertical section taken along the line A—A in FIG. 2, of a tank furnace for continuously producing crystal glass, according to the present invention; and FIG. 2 is a horizontal section through the same tank furnace, taken along the line B—B in FIG. 1.

The tank furnace for continuously producing crystal glass according to the present invention, comprises the following main parts:

A heating section 1 provided with a set of gas burners (not shown on the drawings), and with a system of regenerating chambers 2 and 3 through which there are discharged alternatively combustion gas or air with fuel, a foundation 4 on which there is mounted a furnace tank 5 with a roof 6 and connected by means of the burners outlet with the heating section 1.

The furnace tank is divided into two sections, i.e. a melting section 8 having a horizontal cross section in a shape similar to that of a horse shoe, while the said melting section is provided with a charging door 15, and a mixing section connected with the melting section by means of a sub-surface passage 9. The mixing section consists of two cylindrical chambers 10 and 11 connected one with the other and with the passage 9 by means of channels 12 which are preferably of a cross section having the shape of a trapezoid, while the said chambers are provided with windows 16 through which the finally mixed glass compounds is removed from the furnace. Each of the chambers 10 and 11 is provided with an axially fitted vane mixer 13 driven by a motor M, whereas the diameter D of each chamber ranges from 1.1 to 1.3 of the maximum diameter $d$ of its mixer, and the distance 1 between the axes of the chambers is slightly larger than the diameter D. As a result of the above arrangement, between the chambers there is formed a wedge shaped protrusion 14 the converging part of which is directed towards the passage 9. The rotary speed of the vane mixers 13 preferably ranges from 10 to 15 revolutions per minute, while the direction of rotary motion of both mixers is always the same. However, during the operation of the furnace, the direction of the rotary motion of the both mixers can be reversed in order to reduce erosion of the walls of the chambers. The research work has also shown that the most favorable conditions of homogenization are obtained when the height $h$ of the mixer vanes is approximately equal to the depth H at which they are submerged under the surface of the melted glass compound.

The following is a description of the operation of the tank furnace for continuously producing crystal glass according to the present invention.

Combustion gases of high temperature obtained as a result of burning the fuel gas in the heating section 1 of the furnace, heat the charge loaded through the charge door 15 into the melting section 8 of the furnace tank, causing said charge to be melted and there is then formed a liquid glass compound which flows through the sub-surface passage 9 and through the channels 12 into both chambers 10 and 11 of the mixing section of the furnace tank. In the mixing section of the furnace tank, the melted glass compound is intensively mixed as it is moving with a helical motion directed upwards from the bottom. As a result, nearly the entire surface of the vertical section of the chambers is within the range of operation of the mixers 13, and there is obtained uniform mixing of particular constituents, even in the case when their densities differ to a considerable degree. Moreover, due to the suitable shape of the chambers, there is avoided the formation of dead spaces as a result of which the melted glass compound is completely homogenous in the chambers.

The ready glass compound is removed from the furnace through the windows 16 located along the periphery of the chambers 10 and 11. Due to the above arrangement the output of the mixing section of the furnace tank is approximately equal to the output of its melting section.

The operation of mixing of the melted glass compound in the mixing section of the tank furnace should be carried out continuously, even in the case when there are periodic intervals in removing the ready glass compound from the furnace.

In order to reduce erosion of the chamber walls caused by the moving melted glass compound and to obtain more uniform wear of the said walls, it is of advantage to change from time to time the direction of the rotary motion of the vane mixers. However, both mixers must always rotate in the same direction. The tank furnace according to the present invention can be applied especially for the production of crystal glass of the lead type having large contents of lead oxide.

What is claimed is:

1. Apparatus for the continuous treatment of molten glass comprising a tank including a melting portion for melting glass, and a mixing portion in longitudinal continuation of said melting portion for receiving molten glass from the melting portion, said melting portion being substantially rectangular in horizontal cross section, said tank including a longitudinal connecting portion joining said melting portion and mixing portion, said connecting portion comprising means defining a longitudinal passageway, adjacent the bottom of the tank for the flow of molten glass from the melting portion to the mixing portion, which passageway is narrow both horizontally and vertically relative to said tank, said mixing portion comprising a pair of vertical cylindrical sections tangentially joined together and including a common protrusion extending longitudinally towards said passageway and spaced from said connecting portion to define therewith a pair of transverse apertures each opening into said passageway which is thereby common to both apertures, each said aperture also opening into a respective cylindrical section whereby said sections are connected in parallel with said passageway, said protrusion being wedge shaped and narrowing in the direction towards said passageway, and stirrer means in each section, each section having outlet means in the cylindrical wall thereof for the discharge of mixed molten glass therefrom.

2. Apparatus as claimed in claim 1, wherein said outlets in the walls of the sections are opposite said apertures for the inlet of molten glass.

3. Apparatus as claimed in claim 1, wherein each said stirrer means comprises a single vertical mixer with vanes coaxially disposed in its associated cylindrical section.

4. Apparatus as claimed in claim 3, wherein each said mixer is submerged below the surface of the molten glass in the mixing portion, said mixer having a height approximately equal to the depth at which the vanes are submerged.

5. Apparatus as claimed in claim 4, further comprising means for driving said mixers at a speed of between 10 and 15 r.p.m.

6. Apparatus as claimed in claim 4, wherein said cylindrical sections each has a diameter between 1.1 and 1.3 times the diameter of the mixer therein.

7. Apparatus as claimed in claim 1, wherein said passageway is centrally disposed in a transverse direction relative to said melting portion and said cylindrical sections.

References Cited

UNITED STATES PATENTS

| | | | |
|---|---|---|---|
| 3,198,618 | 8/1965 | Penberthy | 65—346 |
| 3,268,213 | 8/1966 | Cala | 65—178 |
| 3,316,078 | 4/1967 | Brichard | 65—178 |
| 3,236,618 | 2/1966 | Allman | 65—178 |
| 3,420,653 | 1/1969 | Boettner | 65—339 |

S. LEON BASHORE, Primary Examiner

J. B. HARDAWAY, Assistant Examiner

U.S. Cl. X.R.

65—135, 347